United States Patent Office 3,075,937
Patented Jan. 29, 1963

3,075,937
STABILIZED CHLOROETHYLENIC
POLYMER LATEXES
Norman Bilow, Los Angeles, Calif., assignor to The Dow Chemical Company, Midland, Mich., a corporation of Delaware
No Drawing. Filed May 9, 1960, Ser. No. 27,483
12 Claims. (Cl. 260—29.6)

This invention concerns improvements in polymer latex compositions and, more particularly concerns the thermal stability of chloroethylenic polymer latexes.

Chloroethylenic polymer latexes suffer a loss of HCl as a function of age which process is considerably accelerated as the temperature is raised above normal. This degradation yields dark colored composition products causing initially white latexes to darken to yellow, orange, tan and brown hues. This property has resulted not only in a loss of desirable physical properties of the latexes but has limited their usefulness where clearness or matched colors are important.

It is therefore an object of this invention to improve the thermal stability of chloroethylenic polymer latexes.

The foregoing and related objects can be obtained in a stabilized composition of a chloroethylenic polymer latex containing a minor proportion of an alkali metal azide.

The unstable polymeric material adapted to be used in the compositions of the invention comprises any chloroethylenic polymer. This includes, in particular, homopolymers of vinyl chloride and vinylidene chloride as well as copolymers and other interpolymers of vinyl chloride and/or vinylidene chloride with other ethylenic unsaturated comonomers such as vinyl acetate; acrylonitrile; vinyl propionate; the alkyl, cycloalkyl, and aryl acrylates; and the like. The polymeric material also includes blends of a chloroethylenic polymer or copolymer with a nonchlorine containing polymer or copolymer. Degradation of relatively small portions of chloroethylenic polymers can affect significantly relatively large portions of other polymers associated therewith.

The stabilizers of the invention are the alkali metal azides particularly sodium azide and potassium azide. The stabilizer is added to the composition in an optimum proportion of about 0.3 percent. Higher proportions; for example, 0.8–1.0 percent; can be used but no additional advantage is obtained.

The alkali metal azide is added preferably as an aqueous solution for the reason that addition of solid azide causes coagulation. For best results it is recommended that less than about a 10 percent aqueous solution of the azide be used. For example, about 1 ml. of a 3.3 percent solution of sodium azide per 10 ml. of latex is a suitable addition.

Although I do not wish to be limited by the correctness of any theory I believe the azide reacts with the HCl formed in the latex to yield hydrazoic acid which then adds to the double bonds in the polymer.

*Example 1*

A polyvinylchloride latex was prepared in the usual manner. A portion of the latex was retained as a control. Sodium azide in a proportion of 0.1 percent was added to a second portion of the latex. The two portions of latex were heated gradually from 75° C. to 90° C. over a six day period. During this period the control sample took on a dark brown appearance while the portion treated with sodium azide remained substantially clear with only slight darkening.

The heat aged latexes were then dried and heated at 150° C. for 20 minutes. The treated polymer was still much lighter in color than the control polymer.

*Example 2*

A polyvinylidene chloride latex was prepared in the usual manner. A portion of the latex was retained as a control. Sodium azide in a proportion of 0.3 percent was added to a second portion of the latex. The two portions of latex were heated in the same manner as the latexes of Example 1. Again the heated control latex was much darker in color than the treated latex and again the dried control polymer was much darker in color than the treated dry polymer.

The above examples were repeated using latexes formed from polymers of vinyl chloride and vinylidene chloride as well as copolymers of these materials with vinyl propionate, vinyl acetate, acrylonitrile, alkyl acrylates, cycloalkyl acrylates, and aryl acrylates. The examples were also repeated using a variety of proportions of the various alkali metal azides. Results comparable with those reported in the examples above were obtained.

I claim:

1. A stabilized composition of a chloroethylenic polymer latex containing a minor proportion of an alkali metal azide.
2. The composition according to claim 1 wherein the polymer is a copolymer of vinyl chloride and vinylidene chloride.
3. The composition according to claim 1 wherein the polymer is a copolymer of vinyl chloride and vinyl propionate.
4. The composition according to claim 1 wherein the polymer is a copolymer of vinyl chloride and vinyl acetate.
5. The composition according to claim 1 wherein the polymer is a copolymer of vinyl chloride and an alkyl acrylate.
6. The composition according to claim 1 wherein the polymer is a copolymer of vinyl chloride and an aryl acrylate.
7. A stabilized composition of a chloroethylenic polymer latex containing up to about one percent of an alkali metal azide.
8. A stabilized composition of a chloroethylenic polymer latex containing about 0.3 percent of an alkali metal azide.
9. The composition according to claim 1 wherein the azide is sodium azide.
10. The composition according to claim 1 wherein the azide is potassium azide.
11. The composition according to claim 8 wherein the azide is sodium azide.
12. The composition according to claim 8 wherein the azide is potassium azide.

References Cited in the file of this patent
UNITED STATES PATENTS

| | | |
|---|---|---|
| 2,662,867 | Hoertz | Dec. 15, 1953 |
| 2,683,698 | Bates | July 13, 1954 |